United States Patent
Photos et al.

(10) Patent No.: US 11,781,081 B1
(45) Date of Patent: Oct. 10, 2023

(54) SEPARATING SWEET GAS FROM A SOUR GAS STREAM

(71) Applicant: Streamline Innovations, Inc., San Antonio, TX (US)

(72) Inventors: Peter J Photos, El Campo, TX (US); Franklin Hailey Brown, II, San Antonio, TX (US); David Sisk, San Antonio, TX (US); Benjamin Isaac Tyler, San Antonio, TX (US); Michael A Pue, Houston, TX (US)

(73) Assignee: STREAMLINE INNOVATIONS, INC., San Antonio, TX (US)

( * ) Notice: Subject to any disclaimer, the term of this patent is extended or adjusted under 35 U.S.C. 154(b) by 107 days.

(21) Appl. No.: 17/318,533

(22) Filed: May 12, 2021

Related U.S. Application Data

(62) Division of application No. 16/425,278, filed on May 29, 2019, now Pat. No. 11,254,887.

(60) Provisional application No. 62/678,798, filed on May 31, 2018.

(51) Int. Cl.
  *C10L 3/10*   (2006.01)
  *B01D 19/00*  (2006.01)
  *B01J 19/00*  (2006.01)

(52) U.S. Cl.
  CPC .......... *C10L 3/103* (2013.01); *B01D 19/0042* (2013.01); *B01D 19/0063* (2013.01); *B01D 19/0068* (2013.01); *B01J 19/0053* (2013.01); *B01J 2204/005* (2013.01); *B01J 2219/00182* (2013.01); *B01J 2219/00243* (2013.01); *B01J 2219/185* (2013.01); *C10L 2290/54* (2013.01)

(58) Field of Classification Search
  CPC .. C10L 3/10; C10L 3/103; B01D 19/00; B01J 19/00
  See application file for complete search history.

(56) References Cited

U.S. PATENT DOCUMENTS 4,011,304 A * 3/1977 Mancini .................. C01B 17/05
  423/576.6

FOREIGN PATENT DOCUMENTS

WO    WO-2009077037 A1 *  6/2009  ......... B01D 19/0052

OTHER PUBLICATIONS

WO-2009077037-A1_English Translation (Year: 2009).*

* cited by examiner

*Primary Examiner* — Youngsul Jeong
(74) *Attorney, Agent, or Firm* — Anderson Gorecki LLP

(57) ABSTRACT

An oxidation-reduction desulfurization system includes a reactor vessel with sour gas inlet at the bottom and a gas outlet at the top. A primary stage phase separator includes a vertically-oriented pipe with an inlet located inside the reactor vessel. The ratio of the reactor vessel diameter to the pipe inlet diameter is in a range of 2:1 to 5:1. Surface foam and non-gaseous multi-phase mixture including emulsion flow into a partially gas-filled upper section of the vertically-oriented pipe and freefall to a lower level, thereby facilitating mechanical breaking of the foam and the emulsion. A secondary stage phase separator connected to the gas outlet separates non-gaseous surge from sweet gas. Valves and a controller automatically maintain target levels of the non-gaseous multi-phase mixture and non-gaseous surge.

9 Claims, 4 Drawing Sheets

SEPARATING SWEET GAS FROM A SOUR GAS STREAM

TECHNICAL FIELD

Aspects of the present disclosure are generally related to treatment of sour gas and wastewater streams, and more particularly to phase separators for use in oxidation-reduction systems for removing sulfur-based contaminants from sour gas and wastewater streams.

BACKGROUND

Raw natural gas from oil and gas wells typically contains contaminants such as hydrogen sulfide ($H_2S$). Natural gas is usually considered sour if there are more than 5.7 milligrams of hydrogen sulfide per cubic meter of natural gas, which is equivalent to approximately 4 ppm by volume under standard temperature and pressure. Because hydrogen sulfide is highly toxic and sour gas requires relatively costly infrastructure to transport it is desirable to remove the hydrogen sulfide from the sour gas stream at or near the well head. However, commercially viable small-scale field processing systems for desulfurization of raw natural gas have proved to be difficult to implement.

SUMMARY

An apparatus in accordance with some implementations comprises: a first pressure vessel for generating sweet gas from a sour gas stream via an oxidation-reduction reaction that results in formation of surface foam and a non-gaseous multi-phase mixture comprising an emulsion, the first pressure vessel comprising: a first inlet for receiving the sour gas stream; a first outlet for outputting the sweet gas; and a primary stage phase separator comprising a second inlet disposed inside the first pressure vessel and a second outlet for outputting a separated non-gaseous multi-phase mixture, the second inlet located such that the surface foam and the separated non-gaseous multi-phase mixture flow into a partially gas-filled upper section of the primary stage phase separator and freefall to a lower level, thereby facilitating mechanical breaking of the foam and the emulsion. In some implementations the second inlet is located at a level that is optimal for the oxidation-reduction reaction within the first pressure vessel. In some implementations a diameter of the first pressure vessel and a diameter of an orifice of the second inlet are in a ratio in a range of 2:1 to 5:1, inclusive. In some implementations the primary stage phase separator comprises a vertically-oriented pipe and the lower level is defined by a section of the vertically-oriented pipe that is filled with the separated non-gaseous multi-phase mixture. Some implementations comprise a valve that controls flow of the separated non-gaseous multi-phase mixture out of the primary stage phase separator. Some implementations comprise a controller that adjusts the valve to maintain the separated non-gaseous multi-phase mixture at a target level within the vertically-oriented pipe. In some implementations the primary stage phase separator comprises a vertically-oriented upper section, a vertically-oriented lower section, and a horizontally-oriented section that traverses a wall of the first pressure vessel and connects the upper section with the lower section, and wherein the lower level is defined by a portion of the vertically-oriented lower section that is filled with the separated non-gaseous multi-phase mixture. Some implementations comprise a valve that controls flow of the separated non-gaseous multi-phase mixture out of the primary stage phase separator. Some implementations comprise a controller that adjusts the valve to maintain the separated non-gaseous multi-phase mixture at a target level within the vertically-oriented lower section. Some implementations comprise a secondary stage phase separator comprising a second pressure vessel, a third inlet connected to the first pressure vessel outlet for the gas, a third outlet for the gas, and a fourth outlet for non-gaseous surge. Some implementations comprise a valve that controls flow of the non-gaseous surge out of the second pressure vessel. Some implementations comprise a controller that adjusts the valve to maintain the non-gaseous surge at a target level within the second pressure vessel.

An oxidation-reduction desulfurization system in accordance with some implementations comprises: a reactor vessel in which oxidation-reduction of a sour gas stream results in formation of surface foam, gas, and a non-gaseous multi-phase mixture comprising an emulsion, the reactor vessel having a diameter and comprising: a first inlet for receiving the sour gas stream; a first outlet for the gas; and a primary stage phase separator comprising a second inlet disposed inside the reactor vessel and a second outlet for the non-gaseous multi-phase mixture, the second inlet having a diameter and being located such that the surface foam and the non-gaseous multi-phase mixture flow into a partially gas-filled upper section of the primary stage phase separator and freefall to a lower level, thereby facilitating mechanical breaking of the foam and the emulsion, the diameter of the reactor vessel sized relative to the diameter of the second inlet in a ratio in a range of 2:1 to 5:1, inclusive; and a secondary stage phase separator comprising a pressure vessel, a third inlet orifice connected to the first outlet, a third outlet for the gas, and a third outlet for non-gaseous surge. Some implementations comprise a first valve that controls flow of the non-gaseous multi-phase mixture out of the primary stage phase separator and a controller that adjusts the first valve to maintain the non-gaseous multi-phase mixture at a first target level within the primary stage phase separator. Some implementations comprise a second valve that controls flow of the non-gaseous surge out of the secondary stage phase separator, and wherein the controller adjusts the second valve to maintain the non-gaseous surge at a second target level within the secondary stage phase separator. In some implementations the primary stage phase separator comprises a vertically-oriented pipe and the lower level is defined by a section of the vertically-oriented pipe that is filled with the non-gaseous multi-phase mixture. In some implementations the primary stage phase separator comprises a vertically-oriented upper section, a vertically-oriented lower section, and a horizontally-oriented section that traverses a wall of the reactor vessel and connects the upper section with the lower section, and wherein the lower level is defined by a portion of the vertically-oriented lower section that is filled with the non-gaseous multi-phase mixture.

A method in accordance with some implementations comprises: generating a non-gaseous multi-phase mixture and gas from a sour gas stream, the non-gaseous multi-phase mixture comprising an emulsion and foam; separating the gas from the non-gaseous multi-phase mixture with a primary stage phase separator comprising an inlet disposed within a reactor vessel, the reactor vessel having a diameter that is between two-times and five-times, inclusive, a diameter of the inlet; and at least partly mechanically breaking the emulsion and foam by causing the non-gaseous multi-phase mixture to freefall through a partly gas-filled section to a lower level of the primary stage phase separator. Some implementations, wherein the lower level is defined by a portion of the primary stage phase separator that is filled with the non-gaseous multi-phase mixture, comprise automatically adjusting flow of the non-gaseous multi-phase mixture out of the primary stage phase separator to maintain the lower level within a predefined range. Some implementations comprise separating non-gaseous surge from the gas in a secondary stage phase separator.

All examples, aspects, and features mentioned in this document can be combined in any technically possible way.

DETAILED DESCRIPTION

Small scale field processing systems for oxidation-reduction desulfurization of raw natural gas have eluded full commercialization due to the complexities of the multiphase nature of the process. The presence of multiple phases (oil, water, solid, and gaseous) promotes the creation of foams and emulsions that can cause operational difficulties such as pump cavitation, clogging, and sensor degradation. The multiphase composition of the raw natural gas stream is further complicated by a wide range in pH, temperature, and flow rate variability.

Figure 1:
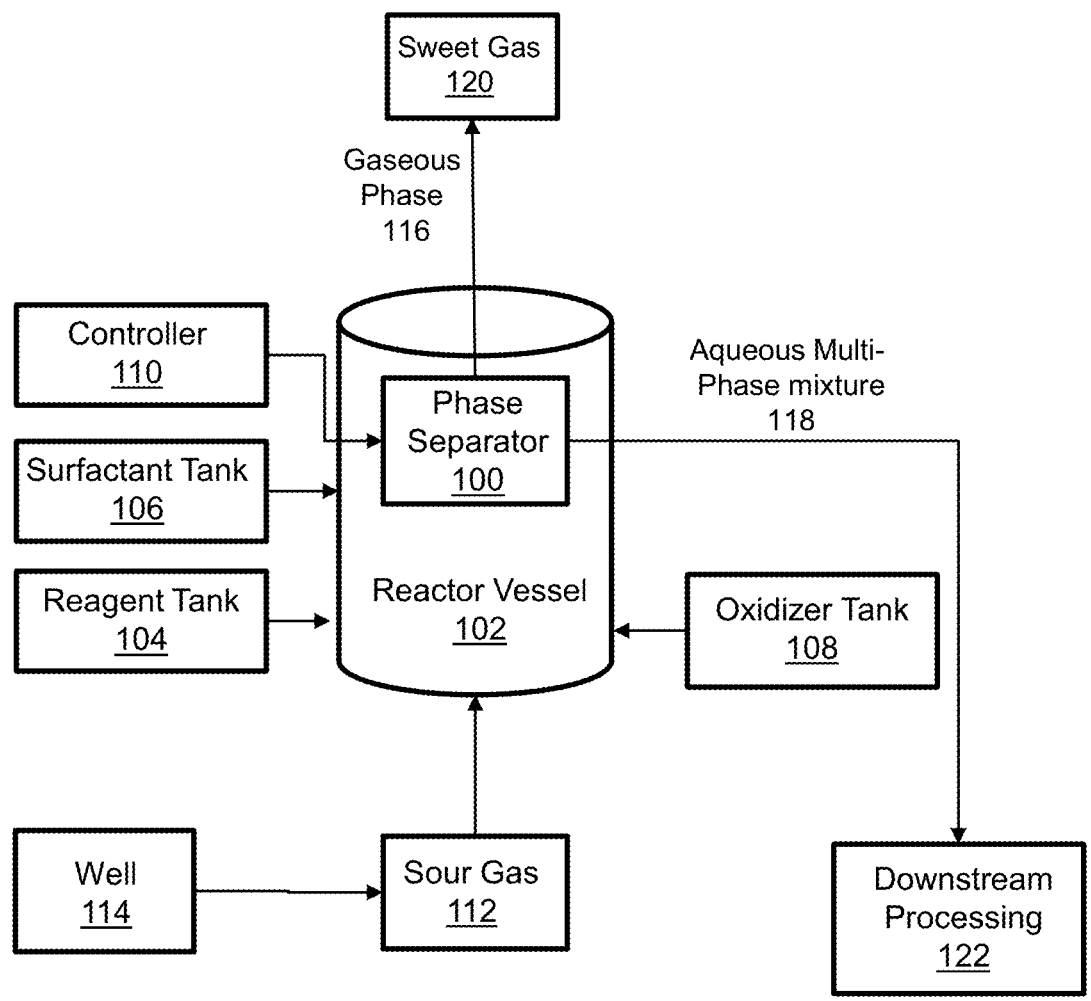
FIG. 1 illustrates an oxidation-reduction desulfurization system with a foam and emulsion breaking phase separator in accordance with some implementations of the invention.

FIG. 1 illustrates an oxidation-reduction desulfurization system with an emulation and foam breaking phase separator 100 in accordance with some implementations of the invention. Although the desulfurization system is described and illustrated in the context of separating sweet gas from a sour gas stream, wastewater that contains sulfur-based contaminants from a wide variety of sources other than oil and gas wells could be treated. The desulfurization system includes a contact tower or reactor vessel (hereafter referred to as a reactor vessel) 102, a reagent tank 104, a surfactant tank 106, an oxidizer tank 108, and a controller 110. A sour gas stream 112 from a well 114 is inputted to the reactor vessel 102. The reactor vessel is a pressure vessel and the sour gas stream is under pressure. Reagent, surfactant, and oxidizer are introduced to the reactor vessel 102 from their respective tanks 104, 106, 108. The reagent may include one or more of ferric salts, ferrous salts, ferric chelants, ferrous chelants, and Fe-MGDA (ferric/ferrous methylglycinediacetate). The oxidizer may include one or more of chlorine, hypochlorous acid, hypochlorite, chlorine dioxide, chlorite, perchlorate, inorganic peroxides, permanganates, sodium, oxygen, and ozone. The surfactant may be a blend of a non-ionic alkyl ethoxylate and a block copolymer, e.g. a diblock copolymer. The hydrogen sulfide in the sour gas stream is oxidized into elemental sulfur, sulfur species, or both by exposure to the reagent and oxidizer in the reactor vessel. The surfactant reduces emulsion formation, promotes settling of sulfur, reduces foaming, and facilitates removal of solids. The phase separator 100, which is partially or wholly within the reactor vessel 102, is used to separate a gaseous phase 116, which consists substantially of sweet gas 120, from the remaining aqueous multi-phase mixture 118. Further, the phase separator mechanically breaks at least some remaining foam and emulsions. Flow through the reactor vessel and phase separator is managed by the controller 110, which may include a PLC (programmable logic controller) and control program. The aqueous multi-phase mixture 118 is provided to downstream processing 122 to recover sulfur (elemental and/or sulfur species) and sweet water.

Figure 2:
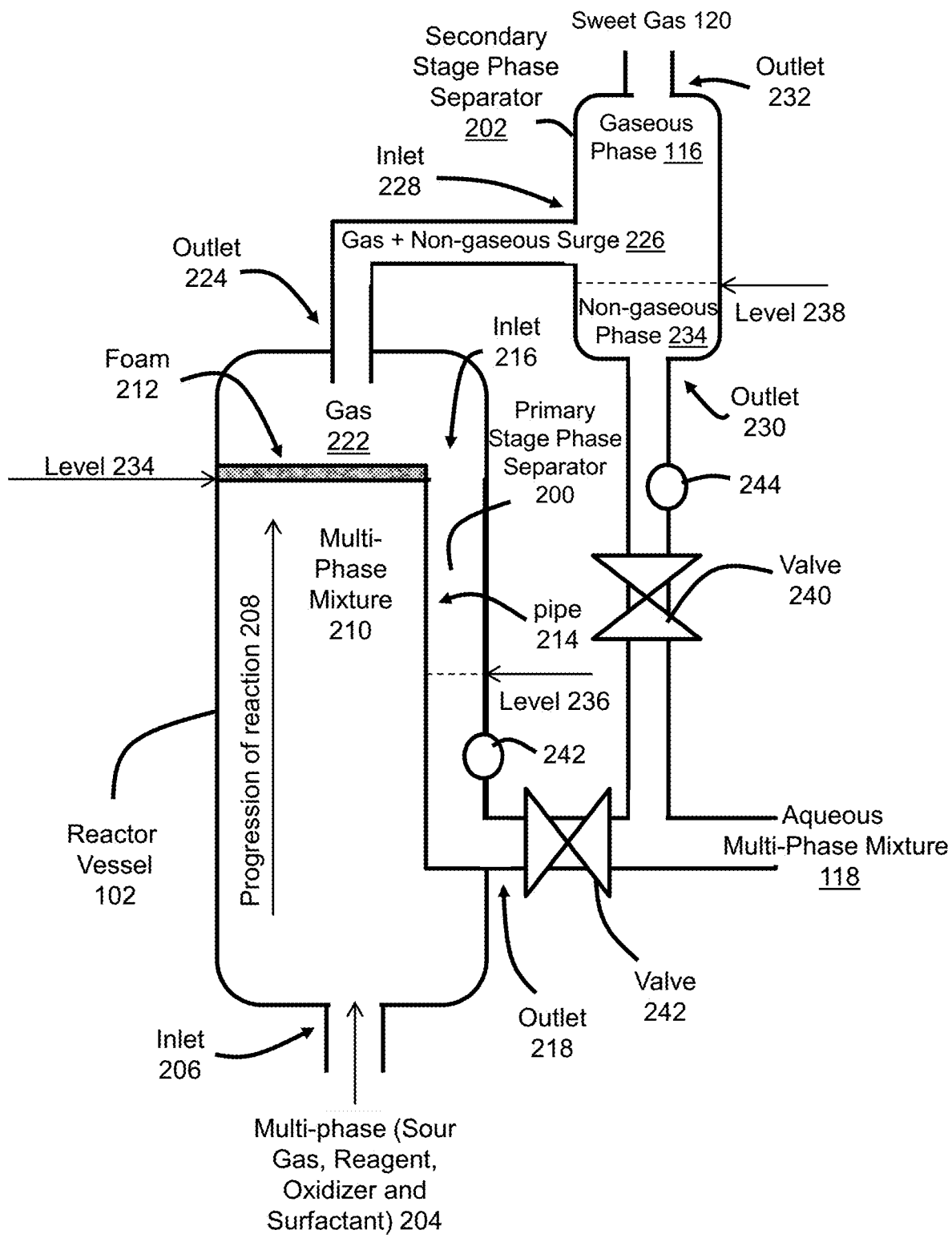
FIG. 2 illustrates an implementation of the phase separator in greater detail.

FIG. 2 illustrates an implementation of the phase separator 100 (FIG. 1) in greater detail. The phase separator includes a primary stage phase separator 200 and a secondary stage phase separator 202 that are implemented as separate vessels. A multi-phase (gas and liquid) mixture 204 of sour gas, aqueous reagent, aqueous oxidizer, and aqueous surfactant is fed into the reactor vessel 102 via one or more inlets, e.g. inlet 206, proximate to the bottom of the reactor vessel. The oxidation-reduction reaction 208 in which hydrogen sulfide in the sour gas stream is oxidized into elemental sulfur, sulfur species, or both by exposure to the reagent and oxidizer progresses upward in the column of the reactor vessel, resulting in a multi-phase mixture 210 of oil, water, solids, gas, and emulsions. Further, a layer of foam 212 forms at the top of the multi-phase mixture 210 within the reactor vessel.

The primary stage phase separator 200 separates a gaseous phase of the multi-phase mixture 210 from a non-gaseous phase. The primary stage phase separator 200 may include a vertically-oriented pipe 214 within the reactor vessel 210. In some implementations the pipe 214 is centered within the reactor vessel 102, but in the illustrated example the pipe is offset from the central axis of the reactor vessel. The pipe 214 separates an interior portion of the primary stage phase separator 200 from the multi-phase mixture 210 in the reactor vessel 102. An inlet 216 at the top of the pipe 214 is located at the maximum level 234 of the multi-phase mixture 210 optimal for the oxidation-reduction reaction 208 within the reactor vessel. The relatively less dense gas 222 separates from the relatively denser aqueous multi-phase mixture 118 at level 234. The gas 222 collects in head room at the top of the reactor vessel above the inlet 206 of the vertically-oriented pipe 214. The non-gaseous phases of the multi-phase mixture 210, including foam and emulsions, are separated from the less dense gas 222 by flowing into the inlet 216 of the pipe, and spilling downward into the primary phase separator 200, under the force of gravity. More specifically, the non-gaseous phases of the multi-phase mixture 210, including emulsions and foam 212 spills into the partially gas-filled inlet 216 and freefalls to a level 236 at which the aqueous multi-phase mixture 118 is maintained within the pipe 214. The upper section of the pipe 214 is not permitted to fill with the non-gaseous phases of the multi-phase mixture 210. More particularly, the portion of the pipe 214 above level 236 is partially filled with gas 222 so the non-gaseous phases of the multi-phase mixture 210 entering the pipe accelerate and partially disperse and break up due to freefalling inside the partly gas-filled upper section of the pipe and then abruptly decelerating upon contacting the section that is filled with the aqueous multi-phase mixture 118. The freefall and impact may each help to mechanically break the surface foam and emulsions. The gas 222 exits the reactor vessel 102 through an outlet 224 that leads to the secondary phase separator 202. The aqueous multi-phase mixture 118 resulting from breaking up the foam and emulsions of the non-gaseous phases of the multi-phase mixture 210 is sent to downstream processing.

The size of the primary stage phase separator 200 relative to the reactor vessel 102 may be selected for efficient capture of surface foam and emulsions. If the inlet 216 orifice is too large in diameter then excessive quantities of foam 212 may be permitted to exit through outlet 218 without the carryover of the liquid phase. If the inlet 216 orifice is too small in diameter then the pressures within the system will permit the surface foam or emulsion to travel through the system without any liquid phase present. A suitable ratio of reactor vessel to primary stage phase separate diameters may be in the range of 2:1 to 5:1, inclusive.

Because the flow rate of the inputted sour gas stream may vary over time, and the oxidation-reduction reaction may be vigorous, non-gaseous phases of the multi-phase mixture 210 may sometimes surge into the outlet 224 at the top of the reactor vessel 102 along with gas 222. The secondary stage phase separator 202 separates such non-gaseous surge phases (e.g. liquid) from the gas 222. The mixture 226 of gas and non-gaseous surge flows into inlet 228 of the secondary phase separator. The secondary phase separator includes a lower outlet 230 at the bottom of the vessel and an upper outlet 232 at the top of the vessel. Inlet 228 is higher than outlet 230 and lower than outlet 230. The non-gaseous phase 234 of the gas and surge mixture 226 is denser than the gaseous phase 116 so the non-gaseous phase separates from the gas and collects at the bottom of the secondary stage phase separator vessel. The separated gaseous phase exits the secondary phase separator at outlet 232 as sweet gas 120. The separated non-gaseous phase 234 exits the secondary phase separator at outlet 230 and is combined with the aqueous multi-phase mixture 118 from outlet 218 of the primary stage phase separator 200.

Maintaining proper levels of the multi-phase mixtures and separated non-gaseous phase of the surge enables efficient operation. For example, if the level of the aqueous multi-phase mixture 118 in the pipe 214 is too high then the advantageous freefall effect will be reduced or lost. However, if the level of the aqueous multi-phase mixture 118 in the pipe 214 is too low then gas may flow through outlet 128 and fail to be recovered. If the level of the non-gaseous phase 234 in the secondary stage phase separator 202 is too high, then it may pass through outlet 232. However, if the level of the non-gaseous phase 234 in the secondary stage phase separator is too low then gas may be reintroduced to the aqueous multi-phase mixture 118 and fail to be recovered. To avoid the above-described problems the controller 110 (FIG. 1) manages the level of the aqueous multi-phase mixture 118 within the pipe 214 and manages the level of the non-gaseous phase 234 within the secondary phase separator 202. Specifically, the rates of flow and levels are managed by independently controlling valve 240 and valve 242. Valve 240 is located between outlet 230 and the conduit carrying aqueous multi-phase mixture 118 to downstream processing. The control program running on the controller adjusts valve 240 to maintain the non-gaseous phase 234 in the secondary phase separator at target level 238, e.g. restricting flow to raise the liquid level and increasing flow to lower the liquid level. Target level 238 may be anywhere in a range that is lower than inlet 228 and higher than outlet 230. Valve 242 is located between outlet 218 and the conduit carrying aqueous multi-phase mixture 118. The control program running on the controller adjusts valve 242 to maintain the aqueous multi-phase mixture 118 in the secondary phase separator at target level 236, which may be anywhere in a range above outlet 218 and far enough below inlet 216 to enable breakup of foam and emulsion. Sensors 242, 244 provide the controller with current levels as feedback.

Figure 3:
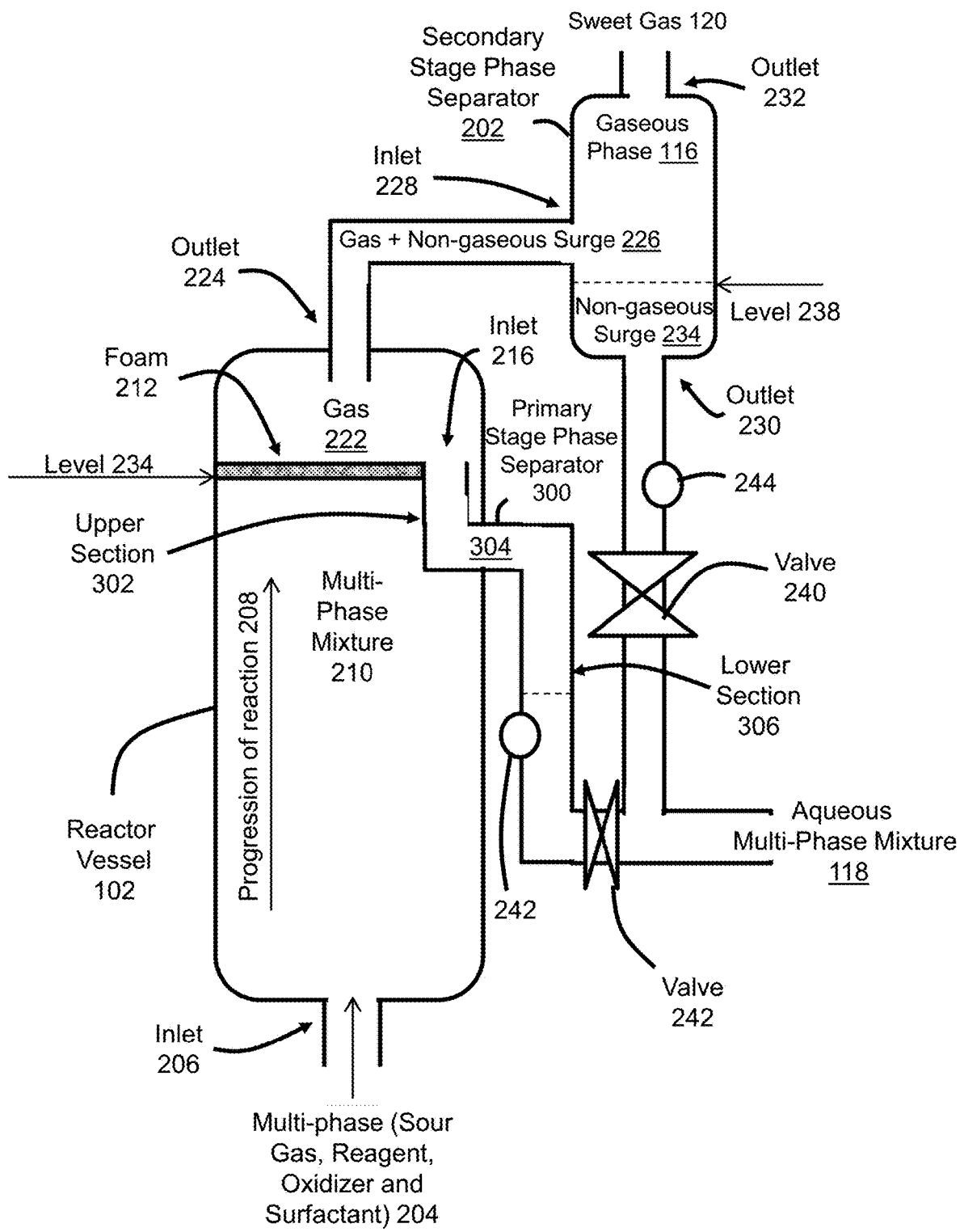
FIG. 3 illustrates an implementation of the phase separator in which the primary stage phase separator is partially outside the reactor vessel.

Referring to FIG. 3, a primary stage phase separator 300 is partially located outside the reactor vessel 102. The primary stage phase separator 300 may include three sections of pipe. An upper section 302 with an inlet 216 is within the reactor vessel. A horizontal section 304 passes through the wall of the reactor vessel 102 and laterally connects the upper section 302 to a lower section 306. The connection interface of the primary stage phase separator allows the reactor vessel to be maintained within industrial recognized standards, for example ASME code, independently from the primary stage phase separator industrial standard. Furthermore, such implementations allow the liquid levels of the reactor vessel and primary stage phase separator to be controlled via sensor feedback data acquired outside the reactor vessel, e.g. from the primary stage phase separator. This enables the process to be used in environments where direct measurement of liquid level inside the reactor vessel is not possible.

Figure 4:
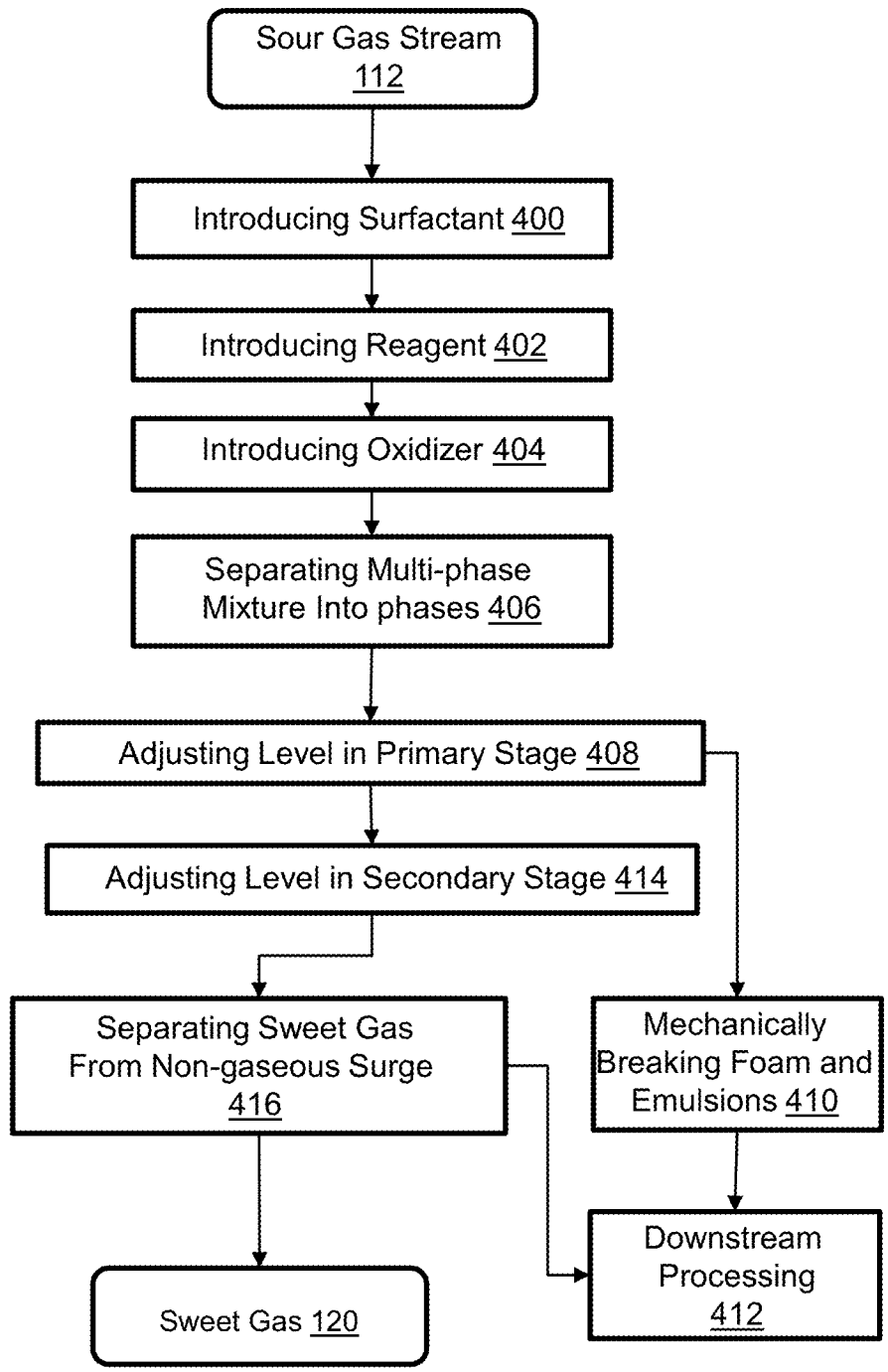
FIG. 4 illustrates a process for oxidation-reduction desulfurization in accordance with some implementations of the invention.

FIG. 4 illustrates a process for oxidation-reduction desulfurization in accordance with some implementations of the invention. Some of the steps may be managed by the control program running on the controller. The order in which steps are performed may be rearranged, and some steps may be implemented partially or wholly concurrently. The sour gas stream 112 is provided as input to the process. Step 400 is introducing the surfactant. Step 402 is introducing the reagent. Step 404 is introducing the oxidizer. The resulting multi-phase mixture is separated into phases in step 406. Adjusting the level of non-gaseous multi-phase mixture in the primary stage phase separator in step 408 facilitates mechanical breaking of foam and emulsions in step 410. Specifically, the level is maintained within a predefined range based on feedback from sensors. The resulting multi-phase mixture undergoes downstream processing in step 412. Adjusting the level of the non-gaseous phase of the surge in the secondary stage phase separator in step 414 enables separation of sweet gas from the non-gaseous surge in step 416. Specifically, the level is maintained within a predefined range based on feedback from sensors. Step 416 results in recovery of sweet gas 120 and non-gaseous surge that is added to the multi-phase mixture from the primary stage phase separator and undergoes downstream processing in step 412.

Several features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:
1. A method comprising:
   generating a non-gaseous multi-phase mixture and sweet gas from a sour gas stream in a reactor vessel, the non-gaseous multi-phase mixture comprising an emulsion and foam;
   separating the sweet gas from the non-gaseous multi-phase mixture with a primary stage phase separator comprising an inlet disposed within the reactor vessel, the reactor vessel having a diameter that is between two-times and five-times, inclusive, a diameter of the inlet; and at least partly mechanically breaking the emulsion and foam by causing the non-gaseous multi-phase mixture to freefall from an upper level of a partly gas-filled vertically-oriented section of the primary stage phase separator to a lower level of the vertically-oriented section of the primary stage phase separator at which an aqueous multi-phase mixture is maintained such that the emulsion and foam are mechanically broken at the lower level of the vertically-oriented section only by freefalling and force of contact with the aqueous multi-phase mixture.

2. The method of claim 1, wherein the lower level is defined by a portion of the primary stage phase separator that is filled with the non-gaseous multi-phase mixture, comprising automatically adjusting flow of the non-gaseous multi-phase mixture out of the primary stage phase separator to maintain the lower level within a predefined range.

3. The method of claim 2, comprising separating non-gaseous multi-phase mixture surge from the sweet gas in a secondary stage phase separator comprising a second pressure vessel, a third inlet connected to a first outlet of the primary stage phase separator, a third outlet for the sweet gas, and a fourth outlet for the non-gaseous multi-phase mixture surge.

4. The method of claim 3, comprising controlling flow of the non-gaseous multi-phase mixture surge out of the second pressure vessel with a valve.

5. The method of claim 4, comprising adjusting the valve to maintain the non-gaseous multi-phase mixture surge at a target level within the second pressure vessel.

6. The method of claim 1, wherein the primary stage phase separator comprises a vertically-oriented upper section, a vertically-oriented lower section, and a horizontally-oriented section that traverses a wall of the reactor vessel and connects the upper section with the lower section, and wherein the lower level is defined by a portion of the vertically-oriented lower section that is filled with separated non-gaseous multi-phase mixture, and comprising controlling flow of the separated non-gaseous multi-phase mixture out of the primary stage phase separator with a valve.

7. The method of claim 6, comprising adjusting the valve to maintain the separated non-gaseous multi-phase mixture at a target level within the vertically-oriented lower section.

8. The method of claim 1 wherein the vertically-oriented section of the non-gaseous multi-phase mixture and comprising controlling flow of the separated non-gaseous multi-phase mixture out of the primary stage phase separator with a valve.

9. The method of claim 8, comprising adjusting the valve to maintain the separated non-gaseous multi-phase mixture at a target level within the vertically-oriented pipe.

* * * * *